(12) United States Patent
Dardona et al.

(10) Patent No.: US 9,053,892 B2
(45) Date of Patent: Jun. 9, 2015

(54) IONIZATION DEVICE

(75) Inventors: Sameh Dardona, South Windsor, CT (US); Marcin Piech, East Hampton, CT (US); Joseph V. Mantese, Ellington, CT (US); Max D. Allsworth, London (GB)

(73) Assignee: Walter Kidde Portable Equipment, Inc., Mebane, NC (US)

( * ) Notice: Subject to any disclaimer, the term of this patent is extended or adjusted under 35 U.S.C. 154(b) by 167 days.

(21) Appl. No.: 13/976,475

(22) PCT Filed: Dec. 30, 2010

(86) PCT No.: PCT/US2010/062450
§ 371 (c)(1),
(2), (4) Date: Jun. 27, 2013

(87) PCT Pub. No.: WO2012/091709
PCT Pub. Date: Jul. 5, 2012

(65) Prior Publication Data
US 2013/0277567 A1    Oct. 24, 2013

(51) Int. Cl.
| | | |
|---|---|---|
| G01T 1/00 | (2006.01) | |
| H01J 27/02 | (2006.01) | |
| H01J 35/06 | (2006.01) | |
| H01J 35/18 | (2006.01) | |
| G01T 1/185 | (2006.01) | |
| H01J 35/16 | (2006.01) | |

(52) U.S. Cl.
CPC .............. *H01J 27/02* (2013.01); *H01J 35/065* (2013.01); *H01J 35/16* (2013.01); *H01J 35/18* (2013.01); *H01J 2235/06* (2013.01); *H01J 2235/087* (2013.01); *H01J 2235/186* (2013.01); *G01T 1/185* (2013.01)

(58) Field of Classification Search
CPC .................................. G01T 1/00; G01T 1/185
USPC ................................................... 324/464-470
See application file for complete search history.

(56) References Cited

U.S. PATENT DOCUMENTS

| | | |
|---|---|---|
| 2,702,898 A | 2/1955 | Meili |
| 3,353,170 A | 11/1967 | Meili et al. |
| 3,538,328 A | 11/1970 | Strausser |

(Continued)

FOREIGN PATENT DOCUMENTS

| | | |
|---|---|---|
| EP | 1397030 A1 | 3/2004 |
| GB | 536594 | 5/1941 |

(Continued)

OTHER PUBLICATIONS

International Preliminary Report on Patentability for International application No. PCT/US2010/062450 dated Jul. 11, 2013.

(Continued)

*Primary Examiner* — Vincent Q Nguyen
(74) *Attorney, Agent, or Firm* — Carlson, Gaskey & Olds

(57) ABSTRACT

An illustrated example ionization device includes a pyroelectric electron accelerator that causes electrons to move away from the accelerator. A silicon target is positioned in a path of the electrons. X-ray radiation results from the electrons colliding with the target. In one example embodiment, the electrons moving between the accelerator and the target have energy up to 60 KeV and the target attenuates the energy so that the x-ray radiation has energy between 1 KeV and 3 KeV.

20 Claims, 1 Drawing Sheet

(56) References Cited

U.S. PATENT DOCUMENTS

| | | | |
|---|---|---|---|
| 4,017,733 | A | 4/1977 | Ishii et al. |
| 4,238,788 | A | 12/1980 | Rosauer et al. |
| 5,856,784 | A | 1/1999 | Wiemeyer |
| 6,333,968 | B1 | 12/2001 | Whitlock et al. |
| 6,429,426 | B1 | 8/2002 | Doring |
| 6,560,315 | B1 | 5/2003 | Price et al. |
| 6,586,729 | B2 | 7/2003 | Doring |
| 6,740,874 | B2 | 5/2004 | Doring |
| 6,900,432 | B1 | 5/2005 | Foulger et al. |
| 7,084,401 | B2 | 8/2006 | Bell et al. |
| 7,294,248 | B2 | 11/2007 | Gao |
| 7,459,839 | B2 | 12/2008 | Tolt |
| 7,483,139 | B2 | 1/2009 | Powell |
| 7,576,331 | B2 | 8/2009 | Allsworth et al. |
| 2003/0215052 | A1 | 11/2003 | Grodzins |
| 2009/0041194 | A1* | 2/2009 | Ito et al. .......... 378/122 |
| 2010/0032560 | A1 | 2/2010 | Allsworth |

FOREIGN PATENT DOCUMENTS

| | | |
|---|---|---|
| GB | 1364720 | 8/1974 |
| GB | 2118760 A | 11/1983 |

OTHER PUBLICATIONS

International Search Report and Written Opinion of the International Searching Authority for International application No. PCT/US2010/062450 dated Sep. 29, 2011.

\* cited by examiner

IONIZATION DEVICE

BACKGROUND

There are a variety of detectors that rely upon ionization. For example, ionization is used to ionize gas molecules for detecting the presence of a particular gas or substance.

There are well known ionization sources including Ni63 and Americium 241. Both of these are radioactive. Ni63 is used in ion mobility spectrometry (IMS) and field asymmetric ion mobility (FAIMS) detectors and other applications where high energy, high flux ionization is required. FAIMS, for example, is highly sensitive and selective for toxic and combustible gas detection. Americium 241 is used in smoke detectors, for example.

The ionization in a detector will ionize air or another gas within a test chamber. The test chamber typically has a metal plate that is maintained at a positive voltage. Molecules within the chamber that have been ionized are accelerated toward the plate. A portion of the ions collide with a collector electrode located between the ionization source and the plate. Ions that collide with the plate generate a current and ions that collide with the collector electrode also generate a current. The ratio of these currents is compared to determine whether a substance of interest is present.

One drawback associated with known detectors is that they include a radioactive material within the ionization source. Another drawback is that the source of radioactive particles does not provide a consistent or tunable energy level.

One suggestion for avoiding radioactive materials within an ionization source is to use soft x-rays for ionization. There are challenges associated with realizing an x-ray source for such purposes that fits within the miniaturized electronics requirements for many detector applications.

SUMMARY

An exemplary ionization device includes a pyroelectric electron accelerator that causes electrons to move away from the accelerator. A silicon target is positioned in a path of the electrons. X-ray radiation results from the electrons colliding with the target.

The various features and advantages of a disclosed example will become apparent to those skilled in the art from the following detailed description. The drawings that accompany the detailed description can be briefly described as follows.

DETAILED DESCRIPTION

Figure 1:
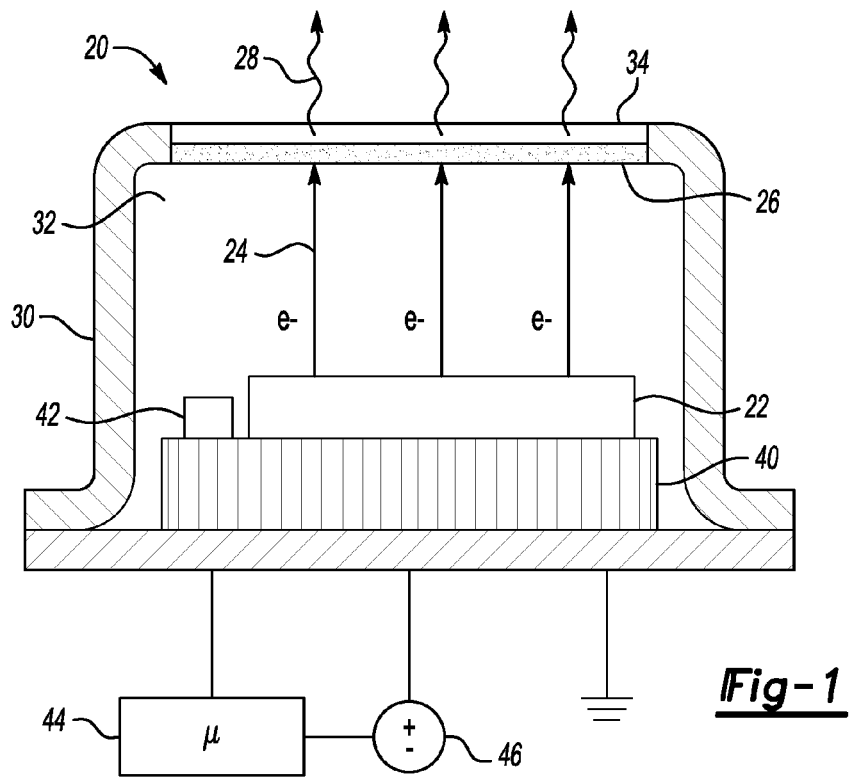
FIG. 1 schematically illustrates an example ionization device designed according to an embodiment of this invention.

FIG. 1 schematically shows an ionization device 20. A pyroelectric crystal electron accelerator 22 operates as a source of electrons schematically shown at 24. The accelerator 22 includes crystallographic Z surfaces of pyroelectric crystals that cause electron acceleration away from those surfaces. This is a known phenomena that occurs when the temperature of the pyroelectric crystals is changed in a dilute gas environment. When the crystal surface is negatively charged in a vacuum or reduced pressure environment, electrons in the close proximity become accelerated away from the surface as schematically shown at 24 in FIG. 1.

A silicon target 26 is positioned in a path of the electrons 24. As the electrons collide with the silicon target 26, x-ray radiation schematically shown at 28 results. The x-rays are useful for ionization of a gas near the ionization device 20.

One feature of the silicon target 26 is that it attenuates the energy of the electrons 24 to produce x-rays having a high enough wavelength to ionize air or another gas for detection purposes. The electrons 24 accelerated from the pyroelectric electron accelerator 22 can have an energy as high as 60 KeV. For ionization purposes within a detector, for example, the x-rays 28 preferably have an energy between 1 and 3 KeV. The silicon target 26 attenuates the energy of the electrons 24 and provides resulting x-ray radiation 28 with an energy within that range. In one example, the x-ray radiation 28 has an energy of 1.5 KeV. The x-rays 28 also have a wavelength high enough to achieve sufficient interaction with gas molecules near the ionization device 20 so that the ionization device 20 is useful within a detector device.

Using a silicon target 26 provides the desired energy level and wavelength that is useful for ionization. If copper were used for the target, for example, the resultant x-ray radiation would have a higher energy level, for example on the order of 8-10 KeV. That energy level is too high for a desired ionization level within many applications. Silicon is the preferred material for the target 26 in the illustrated example to achieve ionization as needed for efficient detector operation.

The example ionization device 20 includes a housing 30 that establishes a low pressure or vacuum chamber 32 within which a gas is maintained. The low pressure or vacuum conditions within the chamber 32 facilitate movement of the electrons 24 from the accelerator 22 to the silicon target 26. A window 34 is supported by the housing 30 adjacent the target 26. In one example, the window 34 comprises beryllium (Be).

Achieving a desired amount of electron acceleration occurs by controlling the temperature of the pyroelectric crystals of the accelerator 22. The illustrated example includes a temperature control element 40 associated with the accelerator 22 for establishing a temperature that facilitates electron acceleration toward the silicon target 26. A temperature sensor 42 provides temperature information to a microcontroller 44, which controls a voltage source 46 to achieve desired operation of the temperature control element 40 so that a desired amount of electron acceleration is realized. In one example, the temperature control element 40 comprises a heater.

Figure 2:
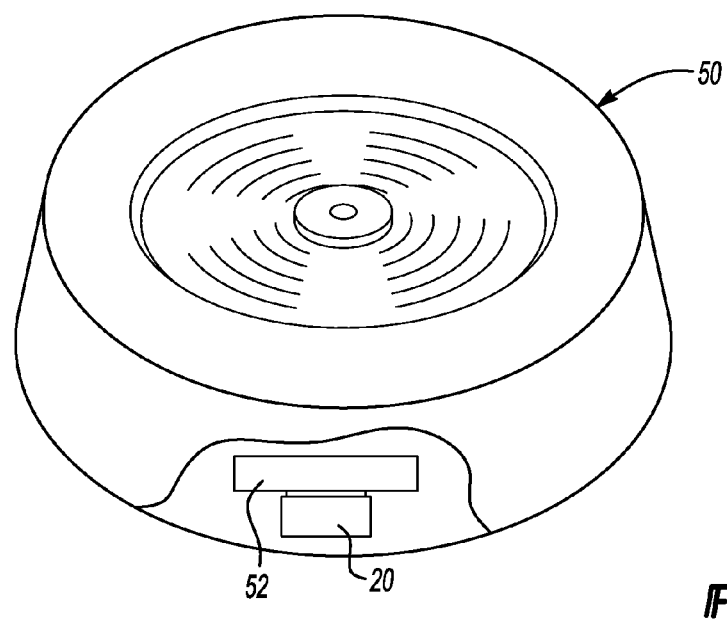
FIG. 2 schematically illustrates selected portions of an example detector incorporating an ionization device such as the example of FIG. 1.

FIG. 2 schematically shows one example use of an ionization device 20 within a detector 50. The ionization device 20 is associated with a detector chamber 52 that is adjacent to the target 26. Air within the detection chamber 52 is ionized by the x-ray radiation 28 provided by the ionization device 20. Known techniques for detecting current resulting from the ionization are used in this example.

One example detector 50 is a smoke detector. If smoke is present within the detection chamber 52, that changes the amount of ionization of the air molecules and the associated current. The detector 50 then provides an indication of the presence of smoke in a known manner. Other detectors such as IMS and FAIMS detectors are possible. The compact, low energy, low power ionization device 20 is useful in a variety of circumstances.

The preceding description is exemplary rather than limiting in nature. Variations and modifications to the disclosed examples may become apparent to those skilled in the art that do not necessarily depart from the essence of this invention.

The scope of legal protection given to this invention can only be determined by studying the following claims.

We claim:

1. An ionization device, comprising:
   a pyroelectric electron accelerator that causes electrons to move away from the accelerator; and
   a silicon target positioned in a path of the electrons for providing x-ray radiation resulting from the electrons colliding with the target, wherein the x-ray radiation has a wavelength such that the x-ray radiation ionizes gas molecules near the target.

2. The device of claim 1, comprising
   a temperature control element associated with the accelerator, the temperature control element establishing a temperature that facilitates the electrons being emitted from the accelerator.

3. The device of claim 2, wherein the temperature control element comprises a heater.

4. The device of claim 2, wherein the temperature control element comprises a microcontroller.

5. The device of claim 1, comprising
   a housing, the accelerator being supported within the housing and the silicon target is situated relative to the housing so that the electrons travel within the housing from the accelerator toward the target and the x-ray radiation travels outside of the housing.

6. The device of claim 5, comprising
   a gas within the housing, the gas being at a pressure that facilitates electron acceleration within the housing from the accelerator toward the target.

7. The device of claim 1, wherein
   the electrons moving between the accelerator and the target have an energy up to 60 KeV; and
   the target attenuates the energy so that the x-ray radiation has an energy between 1 KeV and 3 KeV.

8. The device of claim 7, wherein the x-ray radiation energy is approximately 1.5 KeV.

9. A detector, comprising
   a detection chamber; and
   an ionization device adjacent the detection chamber, the ionization device ionizing molecules within the detection chamber, the ionization device including a pyroelectric electron accelerator that causes electrons to move away from the accelerator and a silicon target positioned in a path of the electrons for providing x-ray radiation resulting from the electrons colliding with the target, the x-ray radiation having a wavelength for ionizing gas molecules within the detection chamber.

10. The detector of claim 9, wherein the ionization device comprises a temperature control element associated with the accelerator, the temperature control element establishing a temperature that facilitates the electrons being emitted from the accelerator.

11. The detector of claim 10, wherein the temperature control element comprises a heater.

12. The detector of claim 10, wherein the temperature control element comprises a microcontroller.

13. The detector of claim 9, wherein the ionization device comprises
   a housing, the accelerator being supported within the housing and the silicon target is situated relative to the housing so that the electrons travel within the housing from the accelerator toward the target and the x-ray radiation travels outside of the housing.

14. The detector of claim 13, comprising
   a gas within the housing, the gas being at a pressure that facilitates electron acceleration within the housing from the accelerator toward the target.

15. The detector of claim 9, wherein
   the electrons moving between the accelerator and the target have an energy up to 60 KeV; and
   the target attenuates the energy so that the x-ray radiation has an energy between 1 KeV and 3 KeV.

16. The detector of claim 15, wherein the x-ray radiation energy is approximately 1.5 KeV.

17. An ionization device, comprising:
   a pyroelectric electron accelerator that causes electrons to move away from the accelerator;
   a silicon target positioned in a path of the electrons for providing x-ray radiation resulting from the electrons colliding with the target;
   the electrons moving between the accelerator and the target have an energy up to 60 KeV; and
   the target attenuates the energy so that the x-ray radiation has an energy between 1 KeV and 3 KeV.

18. The device of claim 17, wherein the x-ray radiation energy is approximately 1.5 KeV.

19. A detector, comprising
   a detection chamber;
   an ionization device adjacent the detection chamber, the ionization device ionizing molecules within the detection chamber, the ionization device including a pyroelectric electron accelerator that causes electrons to move away from the accelerator and a silicon target positioned in a path of the electrons for providing x-ray radiation resulting from the electrons colliding with the target, the x-ray radiation ionizing molecules within the detection chamber;
   the electrons moving between the accelerator and the target have an energy up to 60 KeV; and
   the target attenuates the energy so that the x-ray radiation has an energy between 1 KeV and 3 KeV.

20. The detector of claim 19, wherein the x-ray radiation energy is approximately 1.5 KeV.

\* \* \* \* \*